(12) United States Patent
Scheper et al.

(10) Patent No.: US 12,137,287 B2
(45) Date of Patent: Nov. 5, 2024

(54) AUTOFOCUS IMAGING CIRCUITRY, AUTOFOCUS IMAGING APPARATUS, AND AUTOFOCUS IMAGING METHOD FOR AN EVENT CAMERA

(71) Applicant: Sony Group Corporation, Tokyo (JP)

(72) Inventors: Kirk Scheper, Stuttgart (DE); Peter Dürr, Stuttgart (DE); Oliver Erdler, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 17/922,786

(22) PCT Filed: Mar. 25, 2021

(86) PCT No.: PCT/EP2021/057767
§ 371 (c)(1),
(2) Date: Nov. 2, 2022

(87) PCT Pub. No.: WO2021/228463
PCT Pub. Date: Nov. 18, 2021

(65) Prior Publication Data
US 2023/0171492 A1 Jun. 1, 2023

(30) Foreign Application Priority Data
May 14, 2020 (EP) .................... 20174764

(51) Int. Cl.
*H04N 23/67* (2023.01)
*G02B 7/38* (2021.01)
(Continued)

(52) U.S. Cl.
CPC ............. *H04N 23/673* (2023.01); *G02B 7/38* (2013.01); *H04N 23/61* (2023.01); *H04N 25/47* (2023.01)

(58) Field of Classification Search
CPC ...... H04N 23/673; H04N 23/61; H04N 25/47; H04N 23/67; H04N 23/71; H04N 23/80; G02B 7/38; G06N 3/049
See application file for complete search history.

(56) References Cited

U.S. PATENT DOCUMENTS 9,412,051 B1   8/2016 Chelian et al.
2017/0337469 A1* 11/2017 Debes .................. G06N 3/04
(Continued)

FOREIGN PATENT DOCUMENTS

CN    109151315 A    1/2019
CN    112689082 A    4/2021
(Continued)

OTHER PUBLICATIONS

Haessig, Germain, et al. "A spiking neural network model of depth from defocus for event-based neuromorphic vision." Scientific reports 9.1 (2019): 3744. (Year: 2019).*
(Continued)

*Primary Examiner* — Shahbaz Nazrul
(74) *Attorney, Agent, or Firm* — XSENSUS LLP (57) ABSTRACT

The present disclosure generally pertains to autofocus imaging circuitry, configured to: obtain, for a first adjusted focus, a first plurality of brightness change events from a brightness change event detection element; obtain, for a second adjusted focus, a second plurality of brightness change events from the brightness change event detection element; and determine a focus based on the first and the second plurality of brightness change events for autofocusing a scene.

18 Claims, 4 Drawing Sheets

(51) Int. Cl.
*H04N 23/61* (2023.01)
*H04N 25/47* (2023.01)

(56) References Cited

U.S. PATENT DOCUMENTS

2018/0234616 A1* 8/2018 Kamat .................. G06T 5/20
2021/0120186 A1  4/2021 Mitani

FOREIGN PATENT DOCUMENTS

| EP | 2975558 B1 | 11/2019 |
| EP | 3809692 A2 | 4/2021 |
| WO | 2017/199233 A1 | 11/2017 |
| WO | 2019/074532 A1 | 4/2019 |

OTHER PUBLICATIONS

International Search Report and Written Opinion mailed on Jun. 21, 2021, received for PCT Application PCT/EP2021/057767, filed on Mar. 25, 2021, 11 pages.
Delbrück, "A Chip That Focuses an Image on Itself ", Self Focusing Chip, California Institute of Technology, 1989, 17 pages.
Haessig et al., "A Spiking Neural Network Model of Depth from Defocus for Event-based Neuromorphic Vision", Scientific Reports, Available Online At: https://doi.org/10.1038/s41598-019-40064-0, vol. 9, No. 3744, Mar. 6, 2019, pp. 1-11.
Huber, "High-Speed Pose Estimation using a Dynamic Vision Sensor", Department of Informatics, Master Thesis, Available Online At: https://www.kutter-fonds.ethz.ch/App_Themes/default/datalinks/BasilHuber_UniZ_MT2014.pdf, XP055162714, Mar. 2014, pp. 1-48.
Gehrig et al: "Asynchronous, Photometric Feature Tracking using Events and Frames", Arxiv.Org, Cornell University Library, 201 Olin Library Cornell University, XP081118977, arXiv:1807.09713v1, Jul. 25, 2018, pp. 1-22.
Gallego et al., "Event-based Vision: A Survey", arXiv:1904.08405v1 [cs.CV], Apr. 17, 2019, pp. 1-25.
Gallego et al., "Focus Is All You Need: Loss Functions for Event-Based Vision", 2019 IEEE/CVF Conference on Computer Vision and Pattern Recognition CVPR, IEEE Computer Society, Jun. 15, 2019, pp. 12272-12281.
Gallego et al., "Focus Is All You Need: Loss Functions For Event-based Vision", IEEE Xplore, CVPR, CVF, 2019, pp. 12280-12289.
Delbrück, "Silicon Retina for Autofocus", Institute for Neuroinformatics (INI), 2000, 4 pages.

* cited by examiner

AUTOFOCUS IMAGING CIRCUITRY, AUTOFOCUS IMAGING APPARATUS, AND AUTOFOCUS IMAGING METHOD FOR AN EVENT CAMERA

CROSS-REFERENCE TO RELATED APPLICATIONS

The present application is based on PCT filing PCT/EP2021/057767, filed Mar. 25, 2021, which claims priority to EP 20174764.9, filed May 14, 2020, the entire contents of each are incorporated herein by reference.

TECHNICAL FIELD

The present disclosure generally pertains to autofocus imaging circuitry, an autofocus imaging apparatus, and an autofocus imaging method.

TECHNICAL BACKGROUND

Generally, it is known to automatically adapt a focus of a lens (stack) of an imaging system (e.g. a camera), also known as autofocusing. For example, known mirrorless cameras, typically have passive autofocus by using phase detection or contrast detection.

In phase detection, dedicated focus pixels are utilized to determine the focus at a frequency, which is decoupled from the main imaging frequency.

In contrast detection, it is swept over a range of focal lengths to determine an optimum focus point.

Although there exist techniques for autofocusing, it is generally desirable to provide autofocus imaging circuitry, an autofocus imaging apparatus, and an autofocus imaging method.

SUMMARY

According to a first aspect, the disclosure provides autofocus imaging circuitry, configured to: obtain, for a first adjusted focus, a first plurality of brightness change events from a brightness change event detection element; obtain, for a second adjusted focus, a second plurality of brightness change events from the brightness change event detection element; and determine a focus based on the first and the second plurality of brightness change events for autofocusing a scene.

According to a second aspect, the disclosure provides an autofocus imaging apparatus, comprising: an imaging device including a plurality of brightness change event detection elements and a plurality of imaging elements; and autofocus imaging circuitry, configured to, for each brightness change event detection element: obtain, for a first adjusted focus, a first plurality of brightness change events from the brightness change event detection element; obtain, for a second adjusted focus, a second plurality of brightness change events from the brightness change event detection element; and determine a focus based on the first and the second plurality of brightness change events for autofocusing a scene.

According to a third aspect, the disclosure provides an autofocus imaging method, comprising: obtaining, for a first adjusted focus, a first plurality of brightness change events from a brightness change event detection element; obtaining, for a second adjusted focus, a second plurality of brightness change events from the brightness change event detection element; and determining a focus based on the first and the second plurality of brightness change events for autofocusing a scene.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
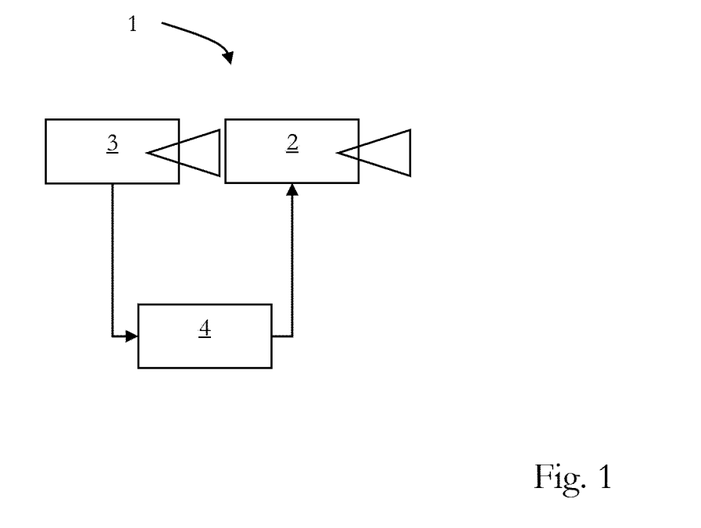
FIG. 1 depicts a block diagram of an autofocus imaging apparatus according to the present disclosure.

Before a detailed description of the embodiments under reference of FIG. 1 is given, general explanations are made.

As mentioned in the outset, known imaging systems or cameras may utilize one of phase detection or contrast detection in order to autofocus.

However, phase detection requires lenses with a comparably high numerical aperture. Therefore, phase detection is rather used in large imaging systems (e.g. microscopes, DSLR (digital single-lens reflex) camera) and not suitable for small devices, such as mobile phones.

On the other hand, contrast detection can generally be used regardless of the numerical aperture of the lens. However, a full range of focal lengths of a used imaging system is typically swept in order to autofocus. Therefore, contrast detection is limited by the measurement rate of the used image sensor and the velocity and accuracy of the used motor, which adjusts the focal length by changing the position of the focus lens(es). Hence, contrast detection may be considered as time inefficient.

Moreover, phase detection as well as contrast detection require image processing in order to focus on a moving object (commonly known as focus tracking or AI (artificial intelligence) servoing). However, the image processing in known systems is therefore limited by the hardware which is used for image processing. For example, in small devices, (e.g. mobile phones), in which a battery power is limited and is therefore desired to be saved, e.g. by a user of the device, the processing power typically needs to be kept small, or conversely need a large battery, if the processing is performed on the device, which is typically undesirable.

For these reasons, especially in a scene with a (fast) moving object, known systems may not be able to focus correctly. The same may be true for difficult lighting conditions (e.g. low ambient light, night, dark room, etc.) or for a scene with a low contrast (e.g. similar colors of different objects).

Therefore, some embodiments pertain to autofocus imaging circuitry, configured to: obtain, for a first adjusted focus, a first plurality of brightness change events from a brightness change event detection element; obtain, for a second, adjusted focus, a second plurality of brightness change events from the brightness change event detection element; and determine a focus based on the first and the second, plurality of brightness change events for autofocusing a scene.

Autofocus imaging circuitry according to the present disclosure may include any known circuitry, e.g. one or multiple processors (e.g. CPU (Central Processing Unit), GPU (Graphic Processing Unit), FPGA(s) (Field Programmable Gate Array(s)), a neuromorphic computing platform, and the like. Moreover, autofocus imaging circuitry may include a system of computers, servers, and the like, as it is generally known.

Such autofocus imaging circuitry may be configured to obtain, for a first (and/or second) adjusted focus, a first (and/or second) plurality of brightness change events from a brightness change event detection element.

For example, autofocus imaging circuitry may be adopted in a camera system including a lens system for focusing incoming light, as it is generally known. The lens system may be adjusted to focus on the first (or second) focus (or focal plane, focal point, and the like), such that light being reflected at or deriving from the adjusted focal plane may be bundled and light from other focal planes may not be bundled, as it is generally known.

If a change of the amount of light in the focal plane occurs, this change may be detected by the brightness change event detection element, if the change is above a predetermined threshold of the amount of light.

For example, in the first adjusted focus, a certain amount of light may be incoming on a brightness change event detection element, thereby generating the first plurality of brightness change events, whereas in the second adjusted focus, which is adapted based on a feedback-loop based on the first plurality of brightness change events, a(nother) certain amount of light may be incoming on the brightness change event detection element, thereby generating the second plurality of brightness change events.

The focus may be determined (and autofocus may be achieved) based, on the second plurality of brightness change events, which are in turn based on the second adjusted focus, which is based on the first plurality of brightness change events, such that the focus in total is determined based on the first and the second plurality of brightness change events. However, in some embodiments, the second plurality of brightness change events is fed to the autofocus imaging circuitry in ways of a feedback-loop, such that an iterative method is established to further refine the determination of the focus.

The amount of light detected by an(y) imaging element may be represented as brightness. Hence, if a change in brightness above a predetermined threshold in the adjusted focus is detected, the brightness change event detection element may generate an event indicating whether a positive change of brightness (e.g. brighter) or a negative change of brightness (e.g. darker) is detected, without limiting the present disclosure in that regard, since only absolute values of brightness changes may be detected, in some embodiments.

Such a brightness change event detection element may be configured of (a pixel) of an event camera, a neuromorphic camera, a silicon retina, a dynamic vision sensor (DVS), and the like.

For example, a brightness change event detection element ay be a part of an optical sensor (e.g. a DVS), i.e. a pixel or a group of pixels thereof.

Each (group of) pixel(s) of the DVS may independently, asynchronously produce a sparse, time-resolved measurement of the change of perceived brightness.

When a pixel measures a change of brightness, which is larger than a predetermined threshold, it generates an event including the (absolute or relative) time, at which the change was detected (e.g. with microsecond resolution), as well as the polarity of the change (positive (i.e. brighter) or negative (i.e. darker)). However, in some embodiments, it is not necessary to determine the polarity of the event. In some embodiments, the brightness change event detection element may be further configured to determine an absolute intensity of the light.

Such a DVS may have a dynamic range above hundred and twenty decibels, for example, a sensitivity of less than fifteen percent with respect to a minimum contrast ratio, and a latency below hundred microseconds, without limiting the present disclosure to any of these properties.

However, such a configuration may maximize a speed while reducing redundant data at the same time for a predetermined lighting scenario.

Since redundant information is minimized, the processing power can be minimized as well. Thereby, focus tracking, for example, may be implemented in a time-efficient manner making it suitable for devices with a limited computational capability (e.g. a mobile phone)

If a lighting condition (e.g. light intensity) is roughly constant, according to the present disclosure, a (temporal) change in intra-scene contrast may be identified. Based on this, a motion estimation, object tracking, video data compression, gesture recognition, and the like may be performed.

As already discussed, a first and a second focus may be adjusted, and therefore, a first plurality of brightness change events for the first adjusted focus (however, it may generally be possible to detect no brightness change events at, all or only one) and a second plurality of brightness change events for the second adjusted focus (or none or only one) may be obtained by the autofocus imaging circuitry according to the present disclosure by evaluating data provided (directly or indirectly) from the brightness change event detection element.

Based on the first and second plurality of brightness change events, the autofocus imaging circuitry may be configured to determine a focus.

For example, if a scene (e.g. an object) is to be imaged, the focal plane in which the scene is localized may be found by comparing the number of brightness change events of the first and the second plurality of brightness change events.

It may be envisaged that a lower number of brightness change events indicates a better focal plane (without limiting the present disclosure in that regard), such that a minimum of events may indicate the focus corresponding to the first or the second adjusted focus.

Moreover, it may be envisaged to perform a focus sweep, i.e. adjusting a plurality of focuses and obtaining for each adjusted focus a plurality of brightness change events in order to generate a brightness change curve, from which the ideal focus can be determined by determining a minimum of the curve, and the like.

Hence, autofocus imaging circuitry according to the present disclosure may be able to determine an autofocus based on an event sensing in different adjusted focuses, such that it may be autofocused on a scene (e.g. an object (of interest)) based on the determined focus.

In some embodiments, the first and the second plurality of brightness change events is indicative of an event density.

That is, for each adjusted focus, a corresponding brightness change event may be determined, such that the brightness change events may be expressed as a function of the adjusted focus, thereby resulting in an event density, which may, in some embodiments, be determined by the autofocus imaging circuitry in order to determine the focus, e.g. based on a minimum of the event density, without limiting the present disclosure in that regard.

However, in some embodiments, the focus may be known as a function of time and the event density may also be known as a function of time, such that the two graphs may be mapped in order to determine the focus.

For example, if a moving object (e.g. a bird, soccer ball, etc.) is to be tracked, the motion of the object may be estimated with a probabilistic filter (e.g. an extended Kalman filter (EKF)) representing the event density. In such a case, a focus sweep, for example, may be limited to a range smaller than the whole focus range and be centered on the estimated trajectory of the tracked, object, such that it is possible to increase the speed of determining the focus.

In some embodiments, the autofocus imaging circuitry is further configured to: determine a contrast based on the determined event density.

Since the contrast may be intertwined with the brightness, as it is generally known, according to the present disclosure, it may be sufficient to determine a contrast based on the event density without the need to do a brightness imaging, but a computationally less complex event sensing instead.

In some, embodiments, a focus sweep is performed for determining a contrast for each focus, and the contrast of an image projected on an image sensor is detected by measuring the rate of change of the event rate or by the rate of change of spatial density of the events. Since the events are produced asynchronously, detecting the contrast according to the present disclosure may be performed faster (e.g. in orders of magnitude) than in known systems since the events are produced asynchronously, as discussed above.

Moreover, in some embodiments, an autofocus imaging apparatus including a high-bandwidth lens (e.g. a liquid lens), is provided, such that a low-latency measurement can be performed, which may enable a closed-loop autofocus. However, the present disclosure is not limited to the case of a high-bandwidth lens, as any lens with an arbitrary bandwidth may be used.

Generally, if a video of a (fast) moving object is captured, there is a need for an autofocus, which adapts its speed to the speed of the object propagating through different focus planes.

Therefore, in some embodiments, the autofocus imaging circuitry is further configured to: track an object based on the determined focus.

The object may be any object, who's relative position to the camera may change due to a movement of the object and/or the camera.

The tracking may be performed with known tracking techniques after the focus is determined or by a re-determining of the focus according to the present disclosure (in order to find the object).

Moreover, if DVS pixels are used, such a re-determining of the focus (i.e. re-focusing) may be carried out in between frames of (color) imaging pixels, such that the re-focusing may not (or only rarely) be visible in a taken image (or in consecutive images).

Generally, the disclosure is not limited to finding (determining) the focus based on the above-mentioned methods (e.g. based on event density), since, in some embodiments, the determination of the focus is further based on a neural network processing the first and the second plurality of brightness change events.

Hence, in some embodiments, the determination of the focus and/or the tracking may be performed with a neural network, or any other artificial intelligence, which may utilize known algorithms.

In some embodiments, at least one of the determination of the focus and the tracking is based on training of an artificial intelligence.

The artificial intelligence (AI) may use machine learning based methods or explicit feature based methods, such as shape matching, for example by edge detection, histogram based methods, template match based methods, color match based methods, or the like. In some embodiments, a machine learning algorithm may be used for performing object recognition, e.g. for comparing a detected predefined object with a recognized object to increase a correctness of a detection, which may be based on at least one of: Scale Invariant Feature Transfer (SIFT), Gray Level Co-occurrence Matrix (GLCM), Gabor Features, Tubeness, or the like. Moreover, the machine learning algorithm may be based on a classifier technique, wherein such a machine learning algorithm may be based on least one of: Random Forest; Support Vector Machine; Neural Net, Bayes Net, or the like. Furthermore, the machine learning algorithm may apply deep-learning techniques, wherein such deep-learning techniques may be based on at least one of: Autoencoders, Generative Adversarial Network, weakly supervised learning, boot-strapping, or the like.

Supervised learning may further be based on a regression algorithm, a perceptron algorithm, Bayes-classification, Naiver Bayer classification, next-neighbor classification, artificial neural network, and the like.

The artificial intelligence may, in such embodiments, be fed with ground truth data, which may correspond to or be based on the predefined object, such that the artificial intelligence may learn to determine the focus.

However, the neural network may employ semi-supervised or unsupervised learning, as well.

For example, for semi-supervised or unsupervised learning, an existing autofocus method, may be used, which, may be a high-performance method, but may determine the autofocus rather slow. However, with such a method, (raw) data may be captured, which may allow to transfer the properties of the (slow) autofocus method to the (faster) method according to the present disclosure. Such a method may be regarded as a type of semi-supervised learning, in a case of a trained autofocus method according to an existing method, or a unsupervised learning, in a case of a manually implemented autofocus.

In some embodiments, the neural network is based on or includes a spiking neural network.

A spiking neural network may employ an analog, a digital or a hybrid neuron model or any related or unrelated asynchronous computational hardware or software.

The brightness change event detection element may produce sparse, time-resolved data asynchronously, in some embodiments, which may be processed by an asynchronous and/or sparse computation platform, such as a spiking neural network, without limiting the present disclosure in that regard.

The spiking neural network may be implemented in (neuromorphic hardware) which may be implemented within an imaging system, or the like. However, the spiking neural network may derive an algorithm for determining the focus and/or for tracking an object externally, and the found algorithm(s) may be implemented in the autofocus imaging circuitry according to the present disclosure.

Such a configuration may lead to a low power consumption and a low latency control of the autofocus imaging circuitry, such that a fast and efficient autofocus determination may be performed.

In some embodiments, the autofocus imaging circuitry is further configured to: obtain at least one of the first and the second plurality of brightness change events based on a detection of a reflection of a structured emission pattern.

For example, a light source (e.g. of a camera system), which may include a plurality of lasers, laser diodes, VCSELs (vertical cavity surface emitting lasers), and the like, may emit structured light, e.g. a plurality of points, a grid, and the like.

Based on the reflection of the emission pattern (and based on the first and/or second adjusted focus), the autofocus imaging circuitry may determine the focus, e.g. by determining an event density based on the structured emission pattern. For example, the focus may already be determined after a first (and only) adjusted focus since a deterioration or a smearing out, of the structure may be indicative of the focal event density.

However, generally, a first and a second focus may be adjusted in order to determine the focus based on the structured light, as discussed herein.

Moreover, the emission pattern may include one or different wavelengths, wherein the present disclosure is not limited to an emission of visible light, as any suitable electromagnetic frequency may be utilized, such as infrared light.

For example, a pixel of a dynamic vision sensor may be responsive in an infrared light range, as well as in a visible light range, without limiting, the present disclosure in that regard.

Thereby, the focus may be determined (quickly) in a dark area (i.e. an area with ambient light below a predetermined threshold), e.g. a (dark) room, a laboratory, and the like.

In some embodiments, the determination of the focus is based on a feedback loop based on the first and second plurality of brightness change events.

For example, it may be desired to find a focus based on the plurality of events which has the least absolute number of events. In such an example, the number of events in the second adjusted focus may be compared with the first adjusted focus. If the number of events of the second adjusted focus is higher (or smaller) than the number of events of the first adjusted focus, a further focus may be adjusted corresponding to the direction of focal length in which still a lower number of events is expected.

Feedback loops are generally known, such that an unnecessary explanation thereof is omitted here. According to the present disclosure, a feedback loop may envisaged since a brightness change event detection element (e.g. a DVS pixel) does not perform imaging, such that it is possible to have a fast feedback loop compared to known autofocus methods, such as contrast sweep, phase detection, and the like.

Some embodiments pertain to an autofocus imaging apparatus, including: an imaging device including a plurality of brightness change event detection elements and a plurality of imaging elements; and autofocus imaging circuitry, configured to, for each brightness change event detection element: obtain, for a first adjusted focus, a first plurality of brightness change events from the brightness change event detection element; obtain, for a second adjusted focus, a second plurality of brightness change events from the brightness change event detection element; and determine a focus based on the first and the second plurality of brightness change events for autofocusing a scene, as discussed herein.

The autofocus imaging apparatus may be implemented in or correspond to any device with a variable focus lens, such as mobile phone, a digital (still or video) camera, a laptop, a notebook, etc., a smart television, and the like.

The autofocus imaging apparatus may include a hybrid imaging device, such as a hybrid DVS (dynamic vision sensor) camera, which may include an image sensor having conventional imaging elements as well as brightness change event detection elements.

Such an image sensor may be based on known, image sensor technologies, such as CMOS (complementary metal oxide semiconductor), CCD (charge coupled device), and the like. The imaging elements of the sensor may be based on known technologies, as well, such as CAPD (current assisted photodiode), SPAD (single photon avalanche diode), or any other diode technology, as it is generally known.

The number of the plurality of imaging elements may be higher than the number of brightness change event detection elements (e.g. a ratio of three to one), since it may not be needed to have a large number of brightness change event detection elements, if it is desired to have a highly resolved image. On the other hand, the ratio may be changed in favor of the brightness change event detection elements, if it is desired to have a more exact focus determination.

Moreover, the arrangement of the imaging elements and the brightness change event detection elements may be any arrangement envisaged by the skilled person and may depend on the application. In some embodiments, the arrangement may be based on a predetermined pattern of the brightness change event detection elements and the imaging elements, e.g. a checkerboard pattern, a reduced checkerboard pattern (i.e. regular, but the respective elements are different in number), an irregular pattern, and the like. Moreover, the predetermined pattern may be based on an even distribution of the brightness change event detection elements in order to find a sufficient average focus of the whole scene, but with "blind" pixels between the imaging elements. In some embodiments, on the other hand, the brightness change event detection elements may be arranged to be in one (or multiple) line(s) (or column(s)) of the sensor, if it is not important to have a good average focus of the scene, but if it is important to have a maximum of connected image points (i.e. pixels). The present disclosure is not limited to these two embodiments of arrangement of the image sensor as any (also arbitrary or random) arrangement may be envisaged.

In some embodiments, however, the imaging device may be based on a dual sensor, i.e. an image sensor and a brightness change event detection sensor having a plurality of brightness change event detection elements. In such embodiments, a beam splitter may be adopted to direct incoming light onto each of the sensors.

In some embodiments, the autofocus imaging circuitry is further configured to, for each brightness change event detection element: determine a brightness change event density for determining a spatial brightness change event density for the plurality of brightness change event elements.

In such embodiments, for each brightness change event detection element, an event density may be determined. This leads to a plurality of event densities distributed on a two-dimensional plane of the image sensor, i.e. a spatial brightness change event density may be concluded therefrom in order to determine a focus which suits the two-dimensional nature of the image sensor in sufficient manner.

In some embodiments, the imaging device has a hybrid sensor with a predetermined pattern of the brightness change event detection elements and the plurality of imaging elements, as discussed herein.

Some embodiments pertain to an autofocus imaging method, including: obtaining, for a first adjusted focus, a first plurality of brightness change events from a brightness change event detection element; obtaining, for a second adjusted focus, a second plurality of brightness change events from the brightness change event detection element; and determining a focus based on the first and the second plurality of brightness change events for autofocusing a scene, as discussed herein.

An autofocus imaging method according to the present disclosure may be carried, out with an autofocus imaging circuitry, an autofocus imaging apparatus, and the like, as discussed herein.

In some embodiments, the autofocus imaging methods further includes: determining an event density based on the first and the second plurality of brightness change events, as discussed herein. In some embodiments, the autofocus imaging methods further includes: determining a contrast based on the determined event density, as discussed herein. In some embodiments, the autofocus imaging methods further includes: tracking an object based on the determined focus. In some embodiments, the determination of the focus is further based on a neural network processing the first and the second plurality of brightness change events, as discussed herein. In some embodiments, the neural network includes a spiking neural network, as discussed herein. In some embodiments, the autofocus imaging methods further includes: obtaining at least one of the first and the second plurality of brightness change events based on a detection of a reflection of a structured emission pattern, as discussed herein. In some embodiments, the determination of the focus is based on a feedback loop based on the first and second plurality of brightness change events, as, discussed herein.

The methods as described herein are also implemented in some embodiments as a computer program causing a computer and/or a processor to perform the method, when being carried out on the computer and/or processor. In some embodiments, also a non-transitory computer-readable recording medium is provided that stores therein a computer program product, which, when executed by a processor, such as the processor described above, causes the methods described herein to be performed.

Returning to FIG. 1, there is depicted an embodiment of an autofocus imaging apparatus 1 according to the present disclosure in a block diagram. Such an imaging apparatus may be implemented in a mirrorless camera.

The autofocus imaging apparatus 1 has a lens stack 2, which is configured to focus incoming light onto a hybrid sensor 3 according to the present disclosure, which includes imaging elements and brightness change event detection elements. The hybrid sensor 3 is, in some embodiments, also implemented as a hybrid DVS (dynamic vision sensor) camera.

The lens stack 2 has a motor for adjusting distances between lenses of the lens stack 2, such that a focus can be adjusted.

The hybrid sensor 3 is configured to generate a plurality brightness change event in response to a change of the incoming light intensity.

Brightness change event data is transmitted to autofocus imaging circuitry 4 according to the present disclosure, which is implemented as a neuromorphic manycore processor, which is a dedicated processor for event data.

The autofocus imaging circuitry 4 induces the lens stack to adjust a second focus after a first plurality of events in a first adjusted focus is obtained, such that a second plurality of brightness change events is generated and obtained by the autofocus imaging circuitry 4. The autofocus imaging circuitry 4 is configured to determine a focus based on the first and second plurality of brightness change events, as discussed herein. This focus is then transmitted to and adjusted in the lens stack 2.

In such a configuration an autofocus feedback loop is constituted, such that each consecutive adjusted focus is adjusted based on the number of events of the current iteration. That means that the present disclosure is not limited to the case of finding exactly a two pluralities of brightness change events and the feedback loop may be iterated a (predetermined) number of times until an optimum focus is determined.

Figure 2:
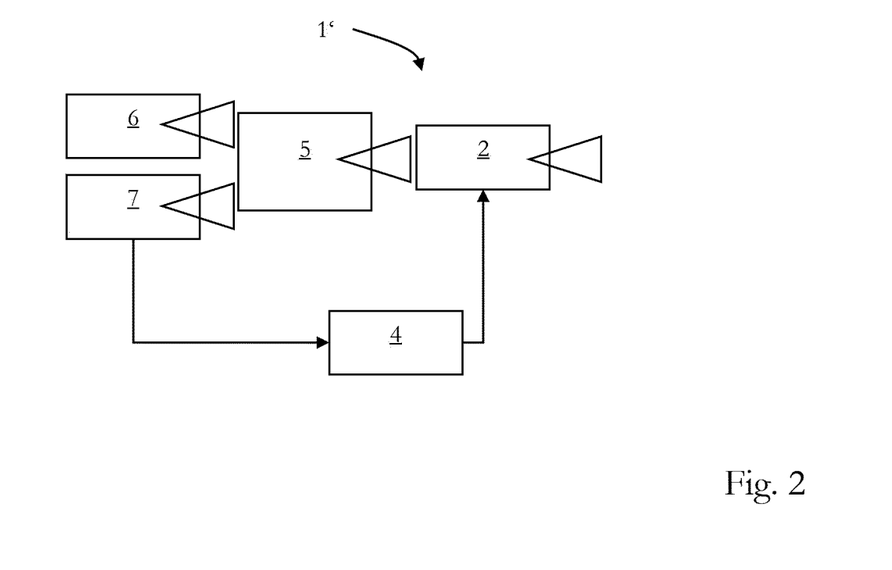
FIG. 2 depicts a block diagram of a further embodiment of an autofocus imaging apparatus according to the present disclosure.

FIG. 2 depicts a further embodiment of an autofocus imaging apparatus 1' according to the present disclosure. Such an imaging apparatus may be implemented in a mirrored camera.

In contrast to the autofocus imaging apparatus 1 of FIG. 1, instead of the hybrid sensor 3, an arrangement of a-beam splitter 5, an image sensor 6 having "conventional" (color) imaging pixels, and a brightness change event detection sensor 7.

In this embodiment, the lens stack 2 focuses the incoming light onto the beam splitter 5, which distributes the light onto the image sensor 6 and the brightness change event detection sensor 7.

From the brightness change event detector 7, the autofocus imaging circuitry 4 obtains a plurality of brightness change events, as discussed above.

It will be appreciated by a person skilled in the art that the present disclosure is not limited to the optical paths as depicted here.

For example, the beam splitter 5 may be replaced by an adjustable mirror configuration, such that the incoming light may be first transmitted to the brightness change event detection sensor 7 in order to determine the focus and after the focus is found, the light may be directed to the image sensor 6.

In other embodiments, one of the two optical paths going to either one of the image sensor 6 or the brightness change event detection sensor 7 may as well be blocked while determining the focus or while imaging the scene, respectively.

Figure 3:
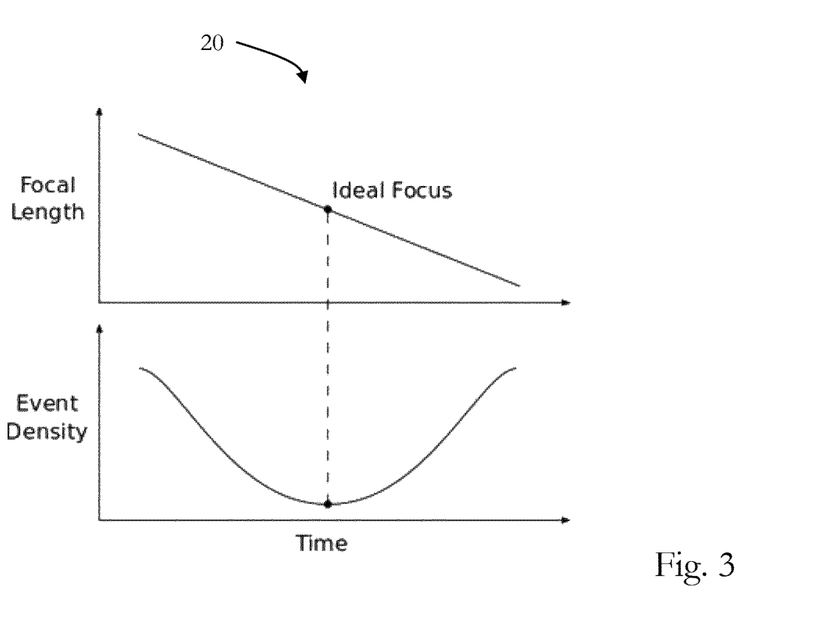
FIG. 3 depicts an embodiment of a probabilistic filter for determining a focus based on an event density.

FIG. 3 depicts an embodiment of a probabilistic filter 20 for determining a focus based on an event density.

The lower graph depicts the event density (symbolic curve), which is generated based on a focus sweep (i.e. for a predetermined number of focuses, a corresponding number of pluralities of brightness change events is obtained).

In this embodiment, it is searched for the minimum of the event density in order to find the optimum focus, since, if the number of events is low, it can be concluded that the amount of scattered and diffracted light is low, as well, such that the focus in a plane of interest (e.g. an object plane) is concluded from the minimum of the event density.

As can be taken from FIG. 3, the abscissas of the two graphs are time, i.e. the two graphs are focal length versus time (top) and event density versus time (bottom). In this embodiment, it is assumed, that the adjusted focal length (of the focus sweep) has a direct impact on the event density, and, with corresponding delays taken into account, the event density can be mapped on a corresponding same time axis as the focal length is mapped onto.

Therefore, a focus can be concluded from the corresponding event density minimum.

Figure 4:
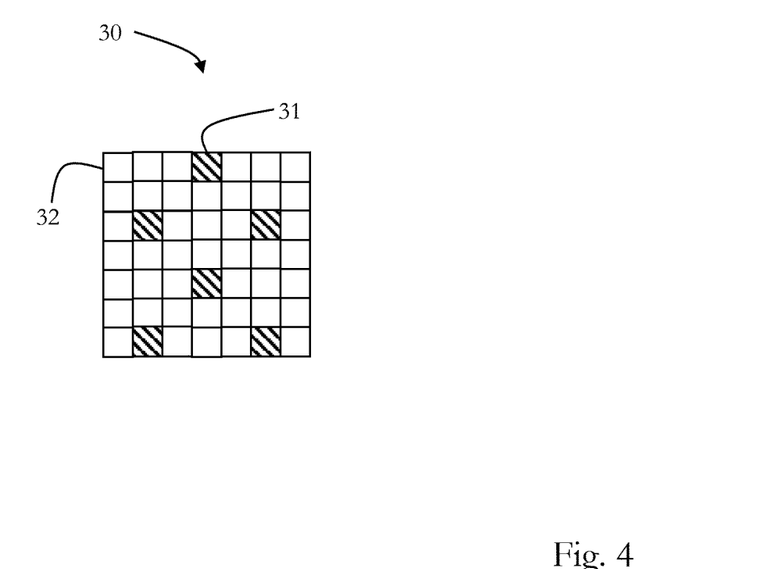
FIG. 4 depicts a schematic view of a hybrid sensor according to the present disclosure.

FIG. 4 depicts a schematic view of a hybrid sensor 30 according to the present disclosure.

The hybrid sensor 30 has brightness change event, detection elements 31 and color imaging elements 32, as they are known.

The hybrid sensor 30 has a predetermined pattern of the brightness change event detection elements 31 and the color imaging elements 32, as discussed herein. Every second line of the hybrid sensor only has color imaging elements 32, wherein in the remaining lines, a line with one brightness change event detection element 31 in the middle of the line alternates with a line with two brightness change event detection elements, which are in the second column seen from the left and from the right, respectively.

In other words, the present hybrid sensor 30 has exemplary seven times seven pixels (of course, the present disclosure is not limited in that regard). In the first line, seen from the left, there are three color imaging elements 32, then a brightness change event detection element 31, then again three color imaging elements 32. In the second line, there are seven color imaging elements. In the fourth line, again, there are seven color imaging elements 32. The fifth to seventh lines are a repetition of the first three lines.

As indicated, it should be recognized that the present disclosure, is not limited to a hybrid sensor having seven times seven pixels, as any number of pixels may generally be provided (e.g. in a Megapixel range), as it is generally known, and the embodiment of the hybrid sensor 30 may be construed as a simplification of such a case.

Figure 5:
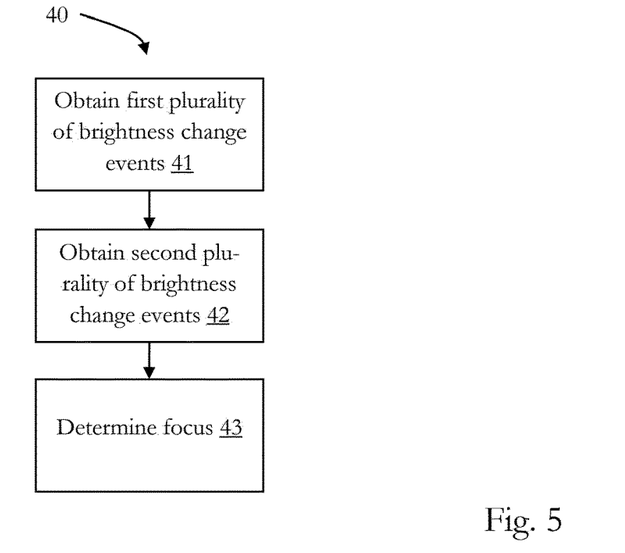
FIG. 5 depicts an autofocus imaging method according to the present disclosure.

FIG. 5 depicts an autofocus imaging method 40 according to the present disclosure in a block diagram.

The autofocus imaging method 40 can be carried out by the autofocus imaging circuitry 4 according to FIGS. 1 and 2.

In 41, a first plurality of brightness change events is obtained from a brightness change event detection element, as discussed herein.

In 42, a second plurality of brightness change events is obtained from the brightness change, event detection element, as discussed herein.

In 43, a focus is determined based on the first and second plurality of brightness change events, as discussed herein.

Figure 6:
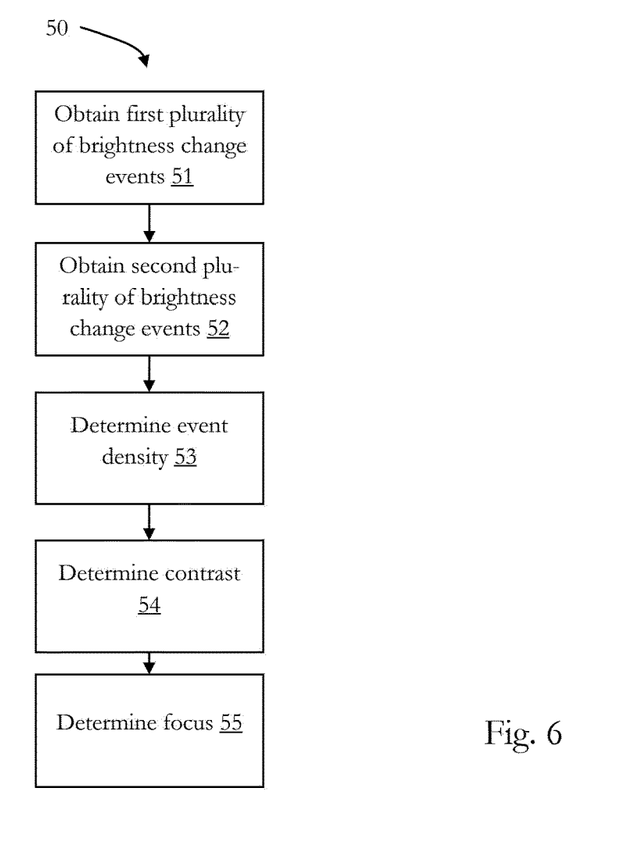
FIG. 6 depicts a further embodiment of an autofocus imaging method according to the present disclosure.

FIG. 6 depicts a further embodiment of an autofocus imaging method 50 according to the present disclosure. The autofocus imaging method 50 differs from the autofocus imaging method 40 in that an event density is determined on which basis a contrast is determined for determining the focus, as discussed herein.

The autofocus imaging method 50 can be carried out by the autofocus imaging circuitry 4 according to FIGS. 1 and 2.

In 51, a first plurality of brightness change events is obtained from a brightness change event detection element, as discussed herein.

In 52, a second plurality of brightness change events is obtained from the brightness change event detection element, as discussed herein.

In 53, based on the first and second plurality of brightness change events, an event density is determined, as discussed herein.

Based on the event density, a contrast is determined as the derivative of the event density, in 54.

Based on the determined contrast, a focus is determined, in 55, by evaluating the zeros of the contrast.

Figure 7:
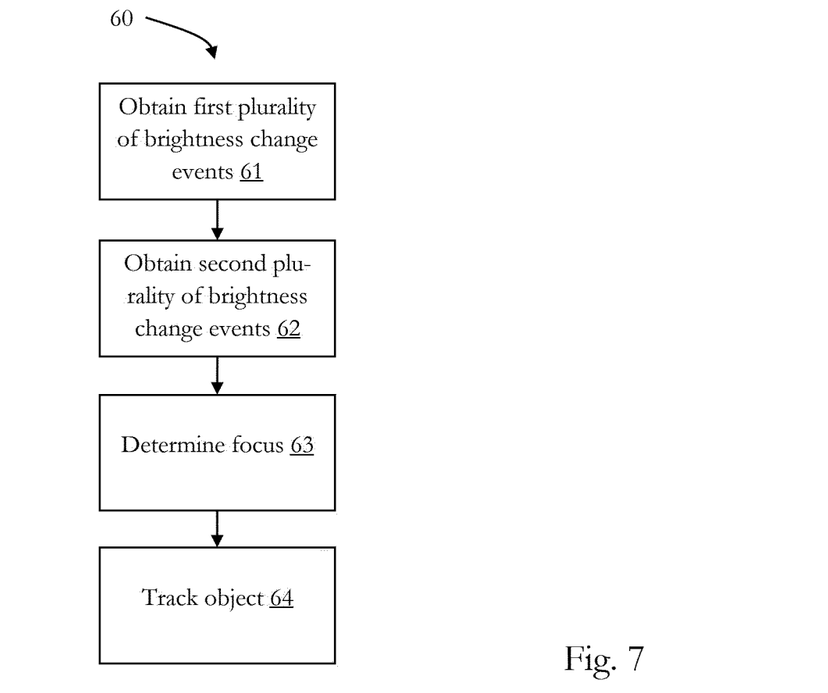
FIG. 7 depicts a further embodiment of an autofocus imaging method according to the present disclosure.

FIG. 7 depicts a further embodiment of an autofocus imaging method 60 according to the present disclosure. In this embodiment, additionally to the autofocus imaging method 40 of FIG. 5, an object is recognized and tracked based on a spiking neural network, as discussed herein.

The autofocus imaging method 60 can be carried out by the autofocus imaging circuitry 4 according to FIGS. 1 and 2.

In 61, a first plurality of brightness change events is obtained from a brightness change event detection element, as discussed herein.

In 62, a second plurality of brightness change events is obtained from the brightness change event detection element, as discussed herein.

In 63, a focus is determined based on, the first and second plurality of brightness change events, as discussed herein.

In 64, an object is recognized by a spiking neural network, and the object is tracked. The focus is then readjusted based on the movement of the object and based on the algorithm developed by the spiking neural network.

Figure 8:
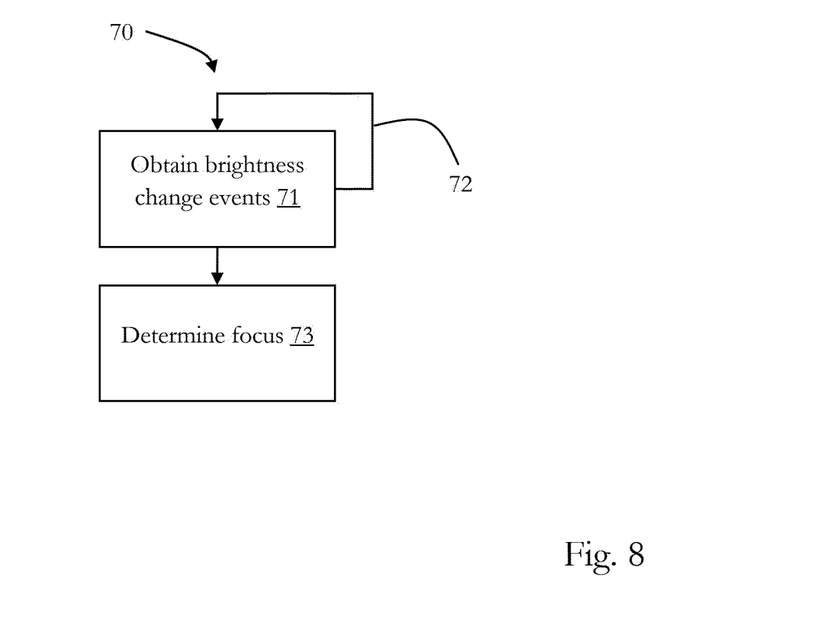
FIG. 8 depicts a further embodiment of an autofocus imaging method according to the present disclosure.

FIG. 8 depicts a further embodiment of an autofocus imaging method 70 according to the present disclosure.

In 71, brightness change events are obtained. The arrow 72 indicates that the brightness change events are obtained based on a feedback-loop, i.e. a first plurality of brightness change events is obtained in a first adjusted focus, on basis of which a second focus is adjusted and a second plurality of brightness change events is obtained. The feedback-loop may have a predetermined number of iteration (e.g. more than a first and a second adjusted focus) for determining the focus or may run as long as the focus can be determined with a certainty above a predetermined threshold.

In 73, the focus is determined based on the obtained brightness change events.

In other words, the focus is determined based on a closed loop to drive a lens of a camera system with an adjustable focus lens.

It should be recognized that the embodiments describe methods with an exemplary ordering of method steps. The specific ordering of method steps is however given for illustrative purposes only and should not be construed as binding. For example, the ordering of 41 and 42 in the embodiment of FIG. 5 may be exchanged. Also, the ordering of 51 and 52 in the embodiment of FIG. 6 may be exchanged. Further, also the ordering of 61 and 62 in the embodiment of FIG. 7 may be exchanged. Other changes of the ordering of method steps may be apparent to the skilled person.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) Autofocus imaging circuitry, configured to:
obtain, for a first adjusted focus, a first plurality of brightness change events from a brightness change event detection element;
obtain, for a second adjusted focus, a second plurality of brightness change events from the brightness change event detection element; and
determine a focus based on the first and the second plurality of brightness change events for autofocusing a scene.

(2) The autofocus imaging circuitry of (1), wherein the first and the second plurality of brightness change events is indicative of an event density.

(3) The autofocus imaging circuitry of (2), further configured to:
determine the event density.

(4) The autofocus imaging circuitry of (3), further configured to:
determine a contrast based on the determined event density.

(5) The autofocus imaging circuitry of anyone of (1) to (4), further configured to:
track an object based on the determined focus.

(6) The autofocus imaging circuitry of anyone of (1) to (5), wherein the determination of the focus is further based on a neural network processing the first and the second plurality of brightness change events.

(7) The autofocus imaging circuitry of (6), wherein the neural network includes a spiking neural network.

(8). The autofocus imaging circuitry of anyone of (1) to 7 further configured to:
obtain at least one of the first and the second plurality of brightness change events based on a detection of a reflection of a structured emission pattern.

(9) The autofocus imaging circuitry of anyone of (1) to (8), wherein the determination of the focus is based on a feedback loop based on the first and second plurality of brightness change events.

(10) An autofocus imaging apparatus, comprising:
an imaging device including a plurality of brightness change event detection elements and a plurality of imaging elements; and
autofocus imaging circuitry, configured to, for each brightness change event detection element:
obtain, for a first adjusted focus a first plurality of brightness change events from the brightness change event detection element;
obtain, for a second adjusted focus, a second plurality of brightness change events from the brightness change event detection element; and
determine a focus based on the first and the second plurality of brightness change events for autofocusing a scene.

(11) The autofocus imaging apparatus of (10), the autofocus imaging circuitry being further configured to, for each brightness change event detection element:
determine a brightness change event density for determining a spatial brightness change event density for the plurality of brightness change event elements.

(12) The autofocus imaging apparatus of anyone of (10) and (11), wherein the imaging device has a hybrid sensor with a predetermined pattern of the brightness change event detection elements and the plurality of imaging elements.

(13) An autofocus imaging method, comprising:
obtaining, for a first adjusted focus, a first plurality of brightness change events from a brightness change event detection element;
obtaining, for a second adjusted focus, a second plurality of brightness change events from the brightness change event detection element; and
determining a focus based on the first and the second plurality of brightness change events for autofocusing a scene.

(14) The autofocus imaging method of (13), further comprising:
determining an event density based on the first and the second plurality of brightness change events.

(15) The autofocus imaging method of (14), further comprising:
determining a contrast based on the determined event density.

(16) The autofocus imaging method of anyone of (13) to (15), further comprising:
tracking an object based on the determined focus.

(17) The autofocus imaging method of anyone of (13) to (16), wherein the determination of the focus is further based on a neural network processing the first and the second plurality of brightness change events.

(18) The autofocus imaging method of (17), wherein the neural network includes a spiking neural network.

(19) The autofocus imaging method of anyone of (13) to (18), further comprising:
obtaining at least one of the first and the second plurality of brightness change events based on a detection of a reflection of a structured emission pattern.

(20) The autofocus imaging method of anyone of (13) to (19), wherein the determination of the focus is based on a feedback loop based on the first and second plurality of brightness change events.

(21) A computer program comprising program code causing a computer to perform the method according to anyone of (11) to (20), when being carried out on a computer.

(22) Anon-transitory computer-readable recording medium that stores therein a computer program product, which, when executed by a processor, causes the method according to anyone of (11) to (20) to be performed.

The invention claimed is:

1. Autofocus imaging circuitry, configured to:
obtain, for a first adjusted focus, a first plurality of brightness change events from a brightness change event detection element;
obtain, for a second adjusted focus, a second plurality of brightness change events from the brightness change event detection element; and
determine a focus for autofocusing a scene using a spiking neural network processing the first and the second plurality of brightness change events, wherein the brightness change event detection element is in a hybrid sensor and has a predetermined pattern of the brightness change event detection elements and a plurality of color imaging elements.

2. The autofocus imaging circuitry of claim 1, wherein the first and the second plurality of brightness change events is indicative of an event density.

3. The autofocus imaging circuitry of claim 2, further configured to:
determine the event density.

4. The autofocus imaging circuitry of claim 3, further configured to:
determine a contrast based on the determined event density.

5. The autofocus imaging circuitry of claim 1, further configured to:
  track an object based on the determined focus.

6. The autofocus imaging circuitry of claim 1, further configured to:
  obtain at least one of the first and the second plurality of brightness change events based on a detection of a reflection of a structured emission pattern.

7. The autofocus imaging circuitry of claim 1, wherein the determination of the focus is based on a feedback loop based on the first and second plurality of brightness change events.

8. An autofocus imaging apparatus, comprising:
  an imaging device including a plurality of brightness change event detection elements and a plurality of imaging elements, wherein the imaging device has a hybrid sensor with a predetermined pattern of the brightness change event detection elements and the plurality of imaging element; and
  autofocus imaging circuitry, configured to, for each brightness change event detection element:
    obtain, for a first adjusted focus, a first plurality of brightness change events from the brightness change event detection element;
    obtain, for a second adjusted focus, a second plurality of brightness change events from the brightness change event detection element; and
    determine a focus based on the first and the second plurality of brightness change events for autofocusing a scene.

9. The autofocus imaging apparatus of claim 8, the autofocus imaging circuitry being further configured to, for each brightness change event detection element:
  determine a brightness change event density for determining a spatial brightness change event density for the plurality of brightness change event elements.

10. An autofocus imaging method, comprising:
  obtaining, for a first adjusted focus, a first plurality of brightness change events from a brightness change event detection element;
  obtaining, for a second adjusted focus, a second plurality of brightness change events from the brightness change event detection element; and
  determining a focus for autofocusing a scene by spiking neural network processing the first and the second plurality of brightness change events, wherein the brightness change event detection element is in a hybrid sensor and has a predetermined pattern of the brightness change event detection elements and a plurality of color imaging elements.

11. The autofocus imaging method of claim 10, further comprising:
  determining an event density based on the first and the second plurality of brightness change events.

12. The autofocus imaging method of claim 11, further comprising:
  determining a contrast based on the determined event density.

13. The autofocus imaging method of claim 10, further comprising:
  tracking an object based on the determined focus.

14. The autofocus imaging method of claim 10, further comprising:
  obtaining at least one of the first and the second plurality of brightness change events based on a detection of a reflection of a structured emission pattern.

15. The autofocus imaging method of claim 10, wherein determining the focus is based on a feedback loop based on the first and second plurality of brightness change events.

16. The autofocus imaging method of claim 10, wherein every second line of the hybrid sensor only has color imaging elements and remaining lines have one brightness change event detection element in the middle of the line alternates with a line with two brightness change event detection elements.

17. The autofocus imaging circuitry of claim 1, wherein every second line of the hybrid sensor only has color imaging elements and remaining lines have one brightness change event detection element in the middle of the line alternates with a line with two brightness change event detection elements.

18. The autofocus imaging apparatus of claim 8, wherein every second line of the hybrid sensor only has color imaging elements and remaining lines have one brightness change event detection element in the middle of the line alternates with a line with two brightness change event detection elements.

* * * * *